[11] 3,584,226

[72] Inventor Bernard Lerner
Hudson, Ohio
[21] Appl. No. 815,853
[22] Filed Apr. 14, 1969
[45] Patented June 8, 1971
[73] Assignee Automated Packaging Systems, Inc.
Twinburg, Ohio

[54] COUNTING SYSTEM
21 Claims, 6 Drawing Figs.
[52] U.S. Cl. ............................................. 250/220,
235/92, 250/222, 350/173, 350/286
[51] Int. Cl. ............................................. H01j 39/12
[50] Field of Search .................................. 250/220,
222, 222 PC; 350/286, 173, 169; 356/102; 235/92
PC, 92 (10)

[56] References Cited
UNITED STATES PATENTS
1,848,874   3/1932   Fitzgerald .................... 250/222X
2,466,455   4/1949   Luboshez ..................... 350/169X
3,349,227  10/1967   Martens et al. ............... 356/102X OTHER REFERENCES
Bramley, " Characteristics of Electro-Optic Display Systems", Proceedings of the IEEE, Vol. 53, No. 6, June 1965, pps. 621— 22, 209/111.7

*Primary Examiner*—James W. Lawrence
*Assistant Examiner*—C. M. Leedom
*Attorney*—Watts, Hoffmann, Fisher and Heinke

ABSTRACT: A counting system including a feeder for dispensing articles to be counted serially. The system has a detecting head and a counter for recording the number of articles which have passed through the head. The head in its preferred form uses a pair of right-angle prisms positioned on opposite sides of a space to be traversed by articles being counted. The prisms are positioned in overlapping relationship to reflect a beam of light from a source back and forth across the space and thence to a detector. Each time the light beam is broken by an object traversing the space, a signal emitted by a detector is recorded by the counter.

INVENTOR.
BERNARD LERNER

BY Watts, Hoffmann,
Fisher & Heinke
ATTORNEYS

COUNTING SYSTEM

BACKGROUND OF THE INVENTION

1. Field of the Invention

This invention relates to counting systems and more particularly to a novel and improved counting system which is especially adapted for counting small parts such as nuts and bolts.

2. Description of the Prior Art

One of the best known prior detecting heads has utilized a pair of spaced, parallel mirrors. A light beam is directed against one of the mirrors. The mirrors reflect the beam back and forth and ultimately to a detector. Whenever a part to be counted passes through the space between the mirrors, the light beam is, at least in theory, broken. Breaking the beam causes the detector to emit a signal which is transmitted to a counter.

These prior counting heads have had a number of disadvantages. One principal disadvantage is the extreme care and precision with which the detector must be made because it is essential that the mirrors be parallel in two planes.

Another disadvantage is susceptibility to vibration. If one raps an early one of the counting heads of the described type, the resultant vibration can cause temporary malalignment of the mirrors. The result of this malalignment is the detector temporarily is not in the path of, and does not receive, the light beam. Since the detector does not receive the beam, a count is recorded even though no object has passed between the mirrors. Thus, if the counting head is accidentally struck, a false signal or series of signals can be transmitted to the counter.

A further disadvantage of the prior mirror devices is they are either inefficient or short lived. The reason for this is that so-called "back-reflective" mirrors are inefficient and front-reflective mirrors are short lived. A front-reflective mirror has the reflective coating on the outer surface. Each time the mirror is wiped for cleaning, the reflective surface is being wiped. This wears away the reflective coating and the useful life is comparatively short.

In a light-beam-type detector, the total area covered in the plane in which the light beam is reflected back and forth will depend on the width of the beam and the number of reflections.

With the prior mirror devices, the somewhat sawtooth-shaped light path makes it necessary to provide a relatively wide light beam if total coverage is to be achieved. The beam must be of a width equal to the space from the center of one reflection to the center of the adjacent reflection if total coverage is to be achieved. This means that over much of the plane in which the light beam is reflected there is considerable beam overlap.

If the beam is wide or reflected enough times so that, for example, a washer causes the beam to be continually broken from the time it starts through until it has finished its passage through the plane of the light beam, other problems are present. Because ambient light is present, and for other reasons, the detectors are designed to sense a reduced light level, not just a light stoppage. Since the beams of the prior mirror devices overlap over a given range of overlap for a given design, the light concentration is not uniform. Accordingly, the amount of light reduction caused by a given part will vary according to where in the plane of the light the part passes. Accordingly, the capability of the detector is limited to the size part which can be reliably detected at a location of low-light concentration.

In the past, other counters have used a single beam. One effective means for avoiding double counts for such objects as washers when passing through a single beam has been to build a time-delay arrangement into the counting circuit. Thus, once the light beam is broken, a predetermined time interval elapses before the system is capable of counting another object. While this avoids double counts with such objects as washers, it inherently results in a reduced total counting capability of the equipment because of the time interval which must elapse between counting events.

SUMMARY OF THE INVENTION

In the preferred arrangement of the present invention, a pair of right-angle prisms are positioned on opposite sides of the space which is to be traversed by objects being counted. With a right-angle prism, any incident light beam is reflected off one and then the other of its two reflecting surfaces and then outwardly along a path paralleling the path of the incident beam.

With the preferred arrangement, the two prisms are positioned symmetrically about a plane which will be referred to as the detection plane. A light source and a detector are positioned symmetrically about the detection plane. A beam of incident light from the source is directed along the detection plane and against a surface of one of the prisms. This light is then reflected a plurality of times, in the plane, so that it traverses the object space along a series of parallel paths and ultimately is directed to the detector.

Because the right-angle prisms have the characteristic of reflecting the light beam outwardly along a path parallel to the path of the incident beam, alignment of the prisms is not critical in the detection plane. Moreover, vibrations that cause temporary malalignment will not affect this parallelism of the light paths in the detection plane. Thus, the detector of this invention is less susceptible to accidental jarring of the detector or vibrations for other reasons.

Since the light is reflected a number of times, complete light coverage of the plane of the detectors is accomplished. If a coherent light source is used, the detection plane can be completely covered with no beam overlap. Thus, the sensitivity of the detector is uniform over the detection plane.

In addition, since the light from the incident beam is reflected by one surface and the output beam is off the other surface, the beam emitting from one prism will first be on the side of the prism remote from the incident beam; and the reflection from the next prism will be on the opposite side. Thus, if the light beam is not truly coherent, the gradual widening of the beam, as the distance from the light source increases, is not an increasing wideness from one end of the space to the other as is the case with parallel mirrors. Rather, the widening is spread, in the plane, over the detection plane.

The detector employed has a relatively small inlet opening for measuring light. With such an arrangement, only the central portion of the beam is measured. Thus, while the light source may not be a coherent source, that part of the beam which is actually used for detecting is small and excellent sensitivity is achieved. The device is, in fact, so sensitive tests have shown that smoke can be detected. While the device is highly sensitive, the beam is reflected so many times with highly-efficient right-angle prisms that such things as washers, once entering the counting space and intercepting the beam, will continue to intercept the beam until the space has been fully traversed.

The use of right-angle prisms has the further advantage that highly-polished surfaces are used and no applied reflective surfaces are relied upon as is the case with mirrors. Thus, the gradual deterioration of reflective surfaces characteristic of mirrors is totally avoided, and a substantially indefinite life span is achieved.

Accordingly, the object of the invention is to provide a novel and improved counting system and more particularly a novel and improved counting head for sequentially and one at a time counting parts for packaging or the like.

Other objects and a fuller understanding of the invention may be had by referring to the following description and claims taken in conjunction with the accompanying drawings.

Figure 1:
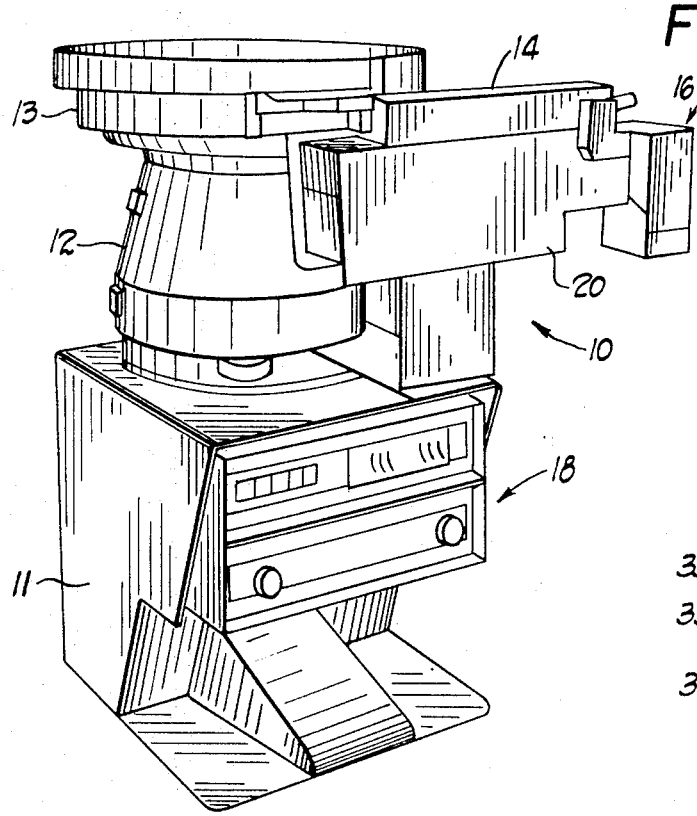
FIG. 1 is a perspective view of a counting mechanism including a part dispenser, a counting head, and a counter.

Referring to the drawings, a counting system is shown generally at 10 in FIG. 1. The system includes a housing 11 which supports a bowl feeder 12. The bowl feeder 12 is of the known vibratory type with the usual bowl 13 equipped with a spiral inclined ramp.

Parts coming off the ramp are deposited serially on an outlet conveyor 14. The outlet conveyor 14 feeds the parts to a counting head 16. Parts passing through the counting head cause a signal to be emitted in a manner which will be described presently. Each signal is counted and recorded by suitable circuitry contained in a counter indicated at 18.

Figure 2:
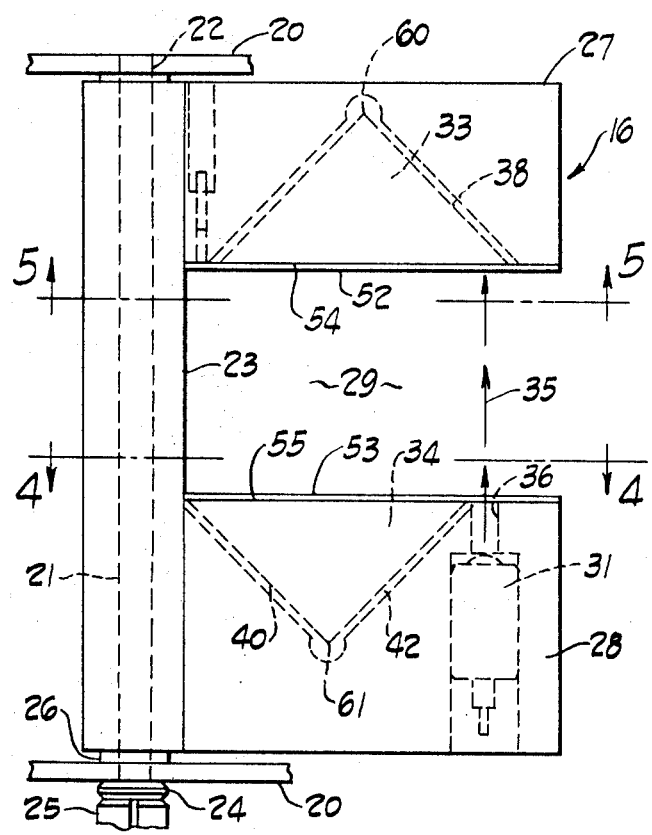
FIG. 2 is a top plan view of the counting head of this invention.

The counting head 16 is mounted on a suitable support arm 20. Referring to FIG. 2, this mounting can be achieved with an elongated bolt 21. The bolt is threaded into the arm at 22. The shank of the bolt extends through a support section 23 of a counting-head frame. A suitable lock washer 24 is interposed between head 25 of the bolt 21 and the support arm 20. Spacers 26 are positioned between the support section 23 and the support arm 20.

The frame of the counting head 16 includes a pair of laterally-extending sections 27, 28 which extend to the right as seen in FIG. 2, from the support section 23. The sections 27, 28 are prism-supporting bodies which define the sides of a parts space 29. The section 27 will be referred to as the detector section since it houses a phototransistor 30. The section 28 will be referred to as the source section since it houses a source 31 of reflectable electromagnetic radiations in the form of a lamp.

Identical detector- and source-side right-angle prisms 33, 34 are provided. The prisms 33, 34 are mounted in triangular-shaped recesses in the detector- and source-side sections 27, 28. The prisms are shown cemented in place, which is quite acceptable. Conventional optical mountings are preferred, however, for commercial units. The detection plane of the prisms is preferably set at a slight angle with the horizontal. As parts come off the conveyor 14 with a horizontal vector, they travel along the detection plane rather than passing vertically through it.

The prisms are, as seen in plan view, slightly offset from one another. Thus, the detector-side prism 33 is positioned to receive an incident beam of light along a path indicated by a line 35. This incident beam path 35 is delineated by a light-collimating passage 36 in the source section 29. The collimating passage 36 is to the right of the source-side prism 34 as viewed in FIG. 2. The source-side prism 34 is offset to the left, as viewed in FIG. 2, with respect to the prism 33 so that the last reflection of any given light beam is from the source-side prism 34 to the detector 30.

Figure 3:
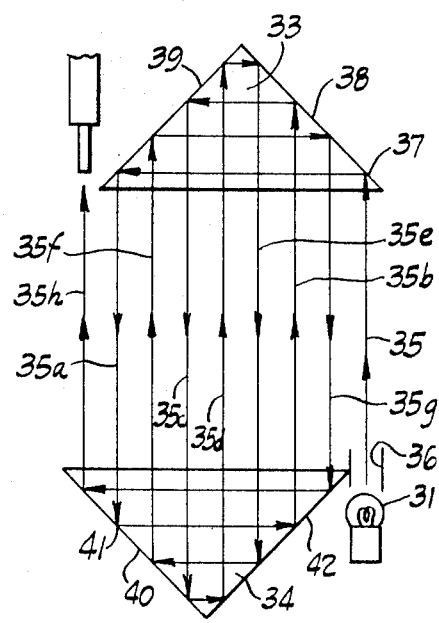
FIG. 3 is a schematic view showing the light path from a source, through multiple reflections by the right-angle prisms, to a detector.

The path followed by a light beam is best understood by reference to FIG. 3. Here it will be seen that the incident beam followed the path line 35 and is first reflected at 37 by the detector-side prism 33. The first reflection 37 is by the first of two right-angle prism reflection surfaces 38. The beam then is reflected by the second reflection surface 39 back toward the source-side prism 34, along a path line 35a parallel to the path line 35. The beam next strikes a first reflective surface 40 of the source-side prism 34 at 41. The beam is reflected from 41 to the second reflective surface 42 of the source-side prism 34. The beam is then reflected back toward the detector-side prism 33 along a path line 35b parallel to the incident path line 35. Thus, each path followed by the beam as it is reflected from one of the prisms to the other is parallel to the path line 35 and all other path lines. These path lines are sequentially numbered 35c —35h.

As an examination of FIG. 3 shows, the path lines are both parallel and uniformly spaced. In the orientation of FIG. 3, there are nine path lines. The offsetting of the prisms 33, 34 is an amount equal to one-eighth of the total width of each reflection means. Similarly, the diameter of the light beam delineated by a collimating passage or aperture 36 is one-eighth of the total width. The total width of the area of the detection plane covered by the light beam is nine times its width so that there is total coverage in the detection plane without overlap. Thus, the amount of overlap, and the desired beam width, are determined by the formula $W/N-1$ where $W$ is the width of each prism in the detection plane and $N$ is the total number of beam paths across the detection space.

As has been suggested, if the radiation source 31 is a source of truly coherent light, the rays are truly parallel. The beam, then, will have a width as delineated by the collimator 36. That beam width will remain throughout. As an examination of FIG. 3 will show, and as is apparent from the preceding discussion, the width is such that full coverage without beam overlap is obtained. This means that, for example, as the beam travels along the path 35a, the edge of the 35a beam will be juxtaposed to the edge of the beams 35f and h. Similarly, the edges of beam 35f will be juxtaposed to the edges of the beams 35a and 35c and so on, providing full coverage in the detection plane between the prisms.

The number of beams that can be obtained (that is, the number of times that a beam will be reflected from one prism to the other) is a function of the amount of overlap of the two prisms. In the arrangement of FIGS. 2—5, any odd number of beams can be attained. In the arrangement of FIG. 6, where another prism 50 is added and where the light source and detectors are both mounted in the frame section 28', any even number of light beams can be attained.

As shown in FIG. 6, only four beams are attained. It will be appreciated however, that if the overlap of the right-angle prisms 33', 34' is increased so that there is reflection back and forth in the manner shown in FIG. 3, any number of light beams can be attained across the space 29' between the prisms 33', 34'. Alternatively, any number of small prisms can be used with the orientation of FIG. 6 to cover any desired area.

Referring again to FIG. 2, the prisms 33, 34 and the detector and light sources 30, 31 are protected from dirt by glass windows 52, 53. The window 52 is adhered to face 54 of the detector-side prism 33 through a suitable optical coupling. The window 52 projects from both sides, as seen from the plan view of FIG. 2, of the detector-side prism 33 so that it provides a smooth facing across the entire transverse length of the detector section 28. Thus the detector 30, the prism 33, their mounting arrangements and the like are all shielded by the window 52.

Similarly, the window 53 is optically coupled to face 55 of the source-side prism 34. The window 53 projects to the right as seen in FIG. 2 to cover the collimating passage 36, and the rest of the side of the source section 29 oriented toward the detector section 28.

It is possible to make the frame for the head 16 a closed rectangle. Thus, one may add a section corresponding to the support section 23 to the right as seen in FIG. 2 to close the right side of the parts space or object passage 29. In the prior art, this has often been considered necessary. However, with the relative unimportance of parallelism of the prisms 33, 34, this extra frame section is not required for rigidity. The provision of a generally C-shaped frame, then, has the advantage that relatively large parts can be counted and one is not limited as to part size to be counted. In fact, one can provide adjustability of the spacing of the sections 27, 28 to enable the counting of parts of even larger size.

Figure 4:
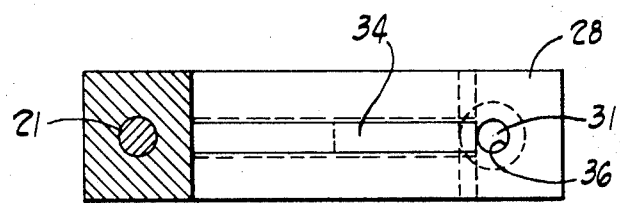
FIGS. 4 and 5 are sectional views of the counting head as seen respectively from the planes indicated by the lines 4—4 and 5—5 of FIG. 2.
Figure 5:
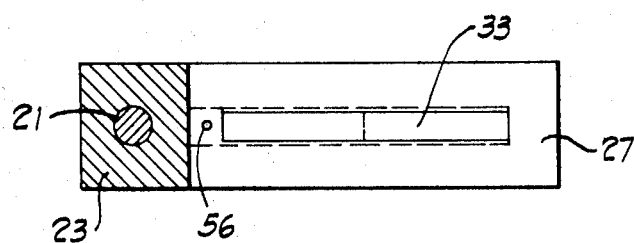
Figure 6:
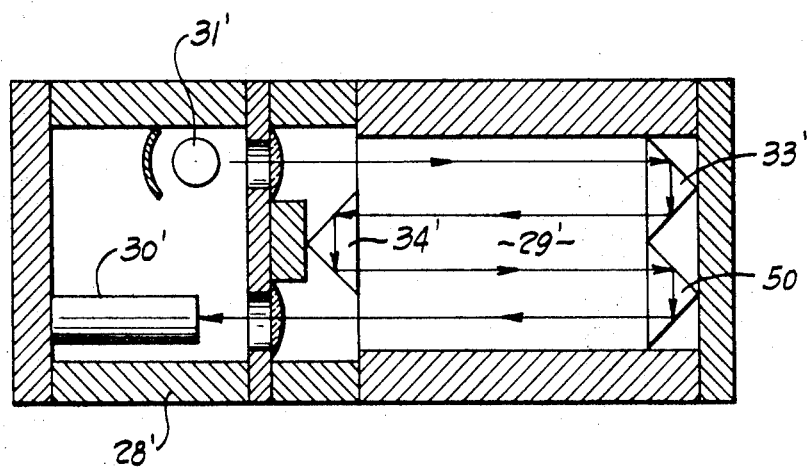
FIG. 6 is a plan view of a counting head of this invention with a light source and the detector mounted on the same side of a counting space.

Referring to FIGS. 4 and 5, it will e seen that the prisms 33, 34, the light source 31 and the detector 30 are positioned symmetrically about a common plane. Because of the use of the relatively wide light beam with a detector having a small collimating inlet 56, there is considerable latitude in the orientation of reflective surfaces 37, 38, 40, 42 relative to this common plane. Expressed another way, these reflective surfaces should be perpendicular to the common plane; but there is considerable latitude in this tolerance. In the common plane, the prisms can be rotated about their vertices 60, 61 as much as 15° in either direction without affecting the operation of the device. Thus, again, a characteristic of the provision of two reflective surfaces at right angles to one another is that any incident light is reflected twice and the second reflection will always be along a path parallel to the incident light.

The preferred prisms as shown are right-angle, isosceles triangles. Thus, the angle at the vertex 61 between the surfaces 38, 39 is 90°. The angles between the surface 38, 39 and the face 54 respectively 45°. Similarly, the angle at the vertex 60 between the surfaces 40, 42 is 90° and the angles at the intersections of the surfaces 40, 42 and the face 55 are each 45°.

Although the invention has been described in its preferred form with a certain degree of particularlity it is understood that the present disclosure of the preferred form has been made only by way of example and that numerous changes in the details of construction and the combination and arrangement of parts may be resorted to without departing from the spirit and the scope of the invention as hereinafter claimed.

What I claim is:

1. A detecting head comprising:
   a. a frame;
   b. first and second reflection means carried by the frame and defining a space therebetween for objects to pass through;
   c. each of said reflection means including reflective surfaces oriented such that an incident beam of radiation is reflected at least twice on each side of the defined space before being reflected to the other reflection means with the last reflection directing a reflected beam outwardly, away from the reflection means, along a path having a predetermined angular relationship to the path of the incident beam;
   d. said reflection means being constructed and positioned such that the beam is reflected back and forth between the reflection means a plurality of times;
   e. a source of reflectable electromagnetic radiation for providing an incident beam to said reflection means; and,
   f. a radiation detector positioned to be responsive to a beam originating from said source and reflected by said reflection means and adapted to emit a signal upon a change in the quantum of radiation received by it due to an object passing through said beam.

2. The head of claim 1 wherein said predetermined angular relationship is a parallel relationship.

3. The head of claim 1 wherein each reflection means has two reflection surfaces substantially at right angles with one another.

4. The head of claim 1 wherein the light-reflection means are right-angle prisms.

5. A counting head comprising:
   a. a frame defining a space for the passage of an object;
   b. a radiation source in fixed relationship with the frame for emitting a beam;
   c. a plurality of reflection means mounted on the frame on opposite sides of said space for receiving said beam and reflecting it back and forth across said space along substantially parallel paths spaced such that the beam along one path is juxtaposed to the beams along adjacent paths to substantially cover said space with radiation in a plane across the space;
   d. a radiation detector positioned to receive said beam after reflection by reflection means; and,
   e. a counter connected to said detector for counting each signal received from said detector when an object passes through said space and intercepts said beam.

6. The device of claim 5 wherein said reflection means are right-angle prisms.

7. The device of claim 6 wherein the right-angle prisms are positioned to reflect said beam in parallel paths lying in a plane.

8. The device of claim 5 wherein said reflection means comprise two prisms and wherein the detector and light source are mounted on opposite sides of said space.

9. The device of claim 5 wherein said reflection means comprise at least three prisms and the light source and detector are mounted on the same side of said space.

10. In combination, a dispenser for parts, a counting mechanism and a counting head, said counting head comprising:
    a. a frame defining a beam opening;
    b. first and second right-angle prisms positioned on opposite sides of said opening and generally symmetrically about a common plane;
    c. a light source positioned to emit a beam of light along that plane and to direct a beam of light against the surface of one of the prisms;
    d. a detector positioned to receive light from the source after it has been reflected by each of the prisms whereby an object passing through the space between the prisms will interrupt the light beam and interrupt the supply of light to the detector, thereby causing the detector to emit a signal; and,
    e. a counter connected to said detector for counting the emitted signals.

11. The combination of claim 10 wherein first and second windows are provided respectively optically coupled to the first and second prisms.

12. The combination of claim 11 wherein the windows overlie the detector and source respectively.

13. In combination with a dispenser of parts and a counting mechanism, the improved counting-head assembly comprising:
    a. a counting-head support arm connected to the dispenser and projecting laterally therefrom;
    b. a counting-head frame support section mounted on the support arm;
    c. spaced source- and detector-side sections projecting laterally from the support section in spaced relationship and defining a part-counting space therebetween;
    d. said side sections each including a prism-receiving space;
    e. source- and detector-side, right-angle isosceles prisms respectively mounted in said spaces and offset with respect to one another;
    f. said source-side section having a source space therein and a collimating aperture extending from the source space in the direction of the detector-side section;
    g. a light source in said source space;
    h. said collimating aperture being oriented such that light emitted from said source will pass along an incident beam path and into said detector-side prism for reflection by two of the surfaces of said prism and thence emission back along a path paralleling the incident path;
    i. said source-side prism being positioned such that it will receive such emitted beam from the detector-side prism, reflect it twice, and direct it back toward the detector-side prism along a path also paralleling said incident beam path;
    j. said detector-side section having a detector space therein;
    k. a detector in said detecting space; and,
    l. said source-side prism being positioned such that the last of its reflections of a given beam which has been reflected a plurality of times by each of the prisms will be directed against the detector, whereby a part passing through any location of said space will interrupt said multiply-reflected beam and cause said detector to emit a signal to the counting mechanism thereby to count such part.

14. The combination of claim 13 wherein first and second windows are provided respectively optically coupled to the source- and detector-side prisms.

15. The combination of claim 14 wherein the windows overlie the detector and source respectively.

16. The combination of claim 13 wherein the detector-side section includes a collimating passage between the space and the detector.

17. A detector for sensing the presence of a material in a detection space comprising:
   a. optical means positioned adjacent the detection space;
   b. a radiation source for directing a beam onto said optical means;
   c. said optical means being adapted to receive an incident beam along an incident path and direct an output beam along a substantially parallel path across said space and offset spatially as it leaves said optical means from said incident beam path, thereby causing the beam to traverse said space in a plurality of spaced and offset paths, said paths being spaced such that the beam along one path is juxtaposed to the beam along adjacent paths to substantially cover said space with radiation in a plane across the space; and,
   d. detection means positioned to receive such beams after it has traversed said space along such plurality of offset and spaced paths and to emit signals in response to variations in the radiation energy received by the detector due to materials traversing said detection space.

18. The detector of claim 17 wherein there are at least two optical means.

19. The detector of claim 18 wherein each optical means includes a plurality of reflective surfaces.

20. The detector of claim 18 wherein said two optical means comprise a pair of right-angle prisms offset in a detection plane a distance equal to $W/N-1$ where $W$ is the width of the prism and $N$ is the total number of times the beam will be directed across said space.

21. The device of claim 20 wherein the beam width is equal to said offset.